(12) United States Patent
Rau et al.

(10) Patent No.: US 12,264,403 B2
(45) Date of Patent: *Apr. 1, 2025

(54) ELECTROCHEMICAL SYSTEM, APPARATUS AND METHOD TO GENERATE METAL HYDROXIDE IN THE PRESENCE OF METAL SILICATES (71) Applicant: Planetary Hydrogen Inc., Dartmouth (CA)

(72) Inventors: Gregory Hudson Rau, Castro Valley, CA (US); Sadaf Tahmasebi, Halifax (CA); Clive Mervyn Hugh Brereton, Richmond (CA); Alexandru Vasile Mezei, Peterborough (CA); Michael John Kelland, Ottawa (CA)

(*) Notice: Subject to any disclaimer, the term of this patent is extended or adjusted under 35 U.S.C. 154(b) by 61 days.

This patent is subject to a terminal disclaimer.

(21) Appl. No.: 17/243,499

(22) Filed: Apr. 28, 2021

(65) Prior Publication Data
US 2021/0340681 A1 Nov. 4, 2021

Related U.S. Application Data
(60) Provisional application No. 63/017,230, filed on Apr. 29, 2020.

(51) Int. Cl.
C25B 9/23 (2021.01)
B01D 53/62 (2006.01)
(Continued)

(52) U.S. Cl.
CPC .............. *C25B 9/23* (2021.01); *B01D 53/62* (2013.01); *C25B 1/02* (2013.01); *C25B 1/20* (2013.01);
(Continued)

(58) Field of Classification Search
CPC .... C25B 1/16; C25B 1/20; C25B 9/23; C25B 1/02; C25B 1/50; C25B 9/21; C25B 9/65;
(Continued)

(56) References Cited

U.S. PATENT DOCUMENTS

| 4,124,471 A | 11/1978 | Lieb et al. |
| 4,197,421 A | 4/1980 | Steinberg |

(Continued)

FOREIGN PATENT DOCUMENTS

| CA | 2682952 | 10/2008 |
| CA | 2786682 | 7/2011 |

(Continued)

OTHER PUBLICATIONS

Tongyan Li, "The Study of CO2 Removal in Slurries with Mg(OH)2 Suspended Particles and the Regeneration of Products," Ph.D Dissertation, University of Cincinnati, Nov. 18, 2015.
(Continued)

*Primary Examiner* — Ciel P Contreras
(74) *Attorney, Agent, or Firm* — IP-MEX Inc.; Victoria Donnelly (57) ABSTRACT An apparatus and method are provided for the electrochemical production of hydrogen, oxygen and metal hydroxide wherein the metal is derived from a metal silicate. The process involves the electrolysis of a metal salt solution where hydrogen and a metal hydroxide are produced at the cathode, and oxygen, or chlorine, and an acid are produced at the anode. The acid is reacted with a metal silicate producing a soluble metal salt and water that is used in turn to make solid or dissolved metal hydroxide. The net $CO_2$ and acid gas emissions of the invention and its products may therefore be significantly reduced or turned negative.

20 Claims, 7 Drawing Sheets (51) Int. Cl.
*C25B 1/02* (2006.01)
*C25B 1/20* (2006.01)
*C25B 1/50* (2021.01)
*C25B 9/21* (2021.01)
*C25B 9/65* (2021.01)
*C25B 15/08* (2006.01)

(52) U.S. Cl.
CPC .............. *C25B 1/50* (2021.01); *C25B 9/21* (2021.01); *C25B 9/65* (2021.01); *C25B 15/081* (2021.01); *C25B 15/083* (2021.01); *C25B 15/085* (2021.01); *C25B 15/087* (2021.01); *B01D 2257/302* (2013.01); *B01D 2257/304* (2013.01); *B01D 2257/402* (2013.01); *B01D 2257/504* (2013.01)

(58) Field of Classification Search
CPC ... C25B 15/081; C25B 15/083; C25B 15/085; C25B 15/087; B01D 53/62; B01D 2257/504
See application file for complete search history.

(56) References Cited

U.S. PATENT DOCUMENTS

| | | | |
|---|---|---|---|
| 4,387,008 | A | 6/1983 | Winyall et al. |
| 4,707,234 | A * | 11/1987 | Mori ............... C08J 5/2237 |
| | | | 204/522 |
| 4,707,348 | A * | 11/1987 | Schuiling ............ A62D 3/36 |
| | | | 423/166 |
| 5,386,838 | A * | 2/1995 | Quincy, III ............ A24D 1/02 |
| | | | 131/365 |
| 6,214,313 | B1 * | 4/2001 | Berisko ............ B01D 53/501 |
| | | | 423/519.2 |
| 7,604,787 | B2 | 10/2009 | Maroto-Valer et al. |
| 8,764,964 | B2 | 7/2014 | Rau |
| 8,834,688 | B2 | 9/2014 | Gilliam et al. |
| 10,005,029 | B2 | 6/2018 | Flynn |
| 10,113,407 | B2 | 10/2018 | Rau |
| 2005/0011770 | A1 | 1/2005 | Katsuyoshi et al. |
| 2005/0126923 | A1 | 6/2005 | Marsden et al. |
| 2006/0185985 | A1 | 8/2006 | Jones |
| 2009/0003240 | A1 | 1/2009 | Negron et al. |
| 2011/0195017 | A1 * | 8/2011 | Martinez Martinez ... C01F 5/22 |
| | | | 423/637 |
| 2012/0183462 | A1 | 7/2012 | Rau |
| 2012/0291675 | A1 * | 11/2012 | Camire .................. C04B 14/26 |
| | | | 423/220 |
| 2016/0362800 | A1 | 12/2016 | Ren et al. |
| 2017/0191173 | A1 | 7/2017 | Han et al. |
| 2020/0024757 | A1 * | 1/2020 | Mani ...................... C25B 1/34 |

FOREIGN PATENT DOCUMENTS

| | | | |
|---|---|---|---|
| JP | S61502525 | * 11/1986 | ............. A62D 3/36 |
| JP | 2001334271 | 12/2001 | |
| WO | 2008124538 | 10/2008 | |
| WO | WO2019/172750 | 9/2019 | |
| WO | 2021061213 | 4/2021 | |

OTHER PUBLICATIONS

Jenine McCutcheon, Gregory M. Dipple, Siobhan A. Wilson, Gordon Southam, "Production of magnesium-rich solutions by acid leaching of chrysotile: A precursor to field-scale deployment of microbially enabled carbonate mineral precipitation," Journal of Chemical Geology, 413 (2015) 119-131.

Noah McQueen, Peter Kelemen, Greg Dipple, Phil Renforth, Jennifer Wilcox, "Ambient weathering of magnesium oxide for CO2 removal from air," Journal of Nature Communications, (2020) 11:3299.

Yoshihiko Sano, YiJia Hao, Fujio Kuwahara, "Development of an electrolysis based system to continuously recover magnesium from seawater," Heliyon Journal (Elsevier), (2018) 2405-8440.

Allan Scott, Christopher Oze, Vineet Shah, Nan Yang, Barney Shanks, Chris Cheeseman, Aaron Marshall, Matthew Watson, "Transformation of abundant magnesium silicate mineral for enhanced CO2 sequestration," Journal of Communications Earth & Environment, (2021) 2:25.

Rau GH, Carroll SA, Bourcier WL, et al. Direct electrolytic dissolution of silicate minerals for air CO2 mitigation and carbon-negative H2 production. Proceedings of the National Academy of Sciences of the United States of America. Jun. 2013;110(25):10095-10100. DOI: 10.1073/pnas.1222358110.

Heping Xie et al. CO2 mineralization of natural wollastonite into porous silica and CaCO3 powders promoted via membrane electrolysis, Environmental Earth Sciences (Feb. 17, 2018) 77:149.

* cited by examiner

ELECTROCHEMICAL SYSTEM, APPARATUS AND METHOD TO GENERATE METAL HYDROXIDE IN THE PRESENCE OF METAL SILICATES

RELATED APPLICATIONS

The present application claims the benefit of the U.S. provisional application 63/017,230 filed on Apr. 29, 2020, entitled "Production of Hydrogen, Oxygen and Metal Hydroxide Using an Electrolyte produced from Metal Silicate", the entire contents of which is being incorporated by reference herein.

FIELD OF THE INVENTION

The present invention generally relates to the field of saline water electrolysis and more particularly, to the electrochemical production of hydrogen, oxygen, and metal hydroxide, in the presence of metal silicates.

BACKGROUND OF THE INVENTION

Hydrogen gas ($H_2$) is a valuable fuel, energy storer and chemical feedstock. It can be produced by a variety of methods including steam reforming of methane, the gasification of a fossil- or biomass-derived hydrocarbons and by the electrolysis of water. In the latter case, a non-chloride metal salt in water can be used as the electrolyte that is split to form oxygen gas ($O_2$) and acid at the anode and hydrogen gas ($H_2$) and hydroxide at the cathode. The $H_2$ are $O_2$ are harvested or vented, and the acid and base react internally to reform the metal salt. The $O_2$ produced can have important uses as a chemical oxidant or feedstock and as a human or biological oxygen supplement.

Metal hydroxides, for example sodium, potassium, calcium or magnesium hydroxide, are important chemical reagents or feedstocks in industrial chemistry and manufacturing. The two primary pathways of production are the calcination of limestone to produce $Ca(OH)_2$ and the electrolysis of a sodium chloride solution to produce sodium hydroxide. In the latter case, NaCl is fed into an electrolysis cell to supply the metal ions ($Na^+$) needed to balance the $OH^-$ generated at the cathode, thus producing NaOH that is removed from the cell. Chlorine gas ($Cl_2$) is produced at the anode. It follows that any other soluble metal salt could be used in similar fashion to produce a corresponding metal hydroxide and where $O_2$, rather than $Cl_2$, production and $H^+$ generation at the anode occurs. However, unlike NaCl, many of these salts are rare in nature and can be expensive to manufacture.

It is therefore of interest to increase availability and lower the cost of such salts and therefore to lower the cost and increase production of the corresponding metal hydroxides they can produce and to avoid the production of $Cl_2$ when this product is undesired.

Because conventional, industrial $H_2$ and $O_2$ production directly or indirectly emits significant quantities of $CO_2$ (an acidic, greenhouse gas) to the atmosphere, it is desirable to reduce such emissions. Prior art shows that the deleterious emissions concomitant with the electrochemical production of $H_2$ and $O_2$ can be largely eliminated by the use of low- or zero-$CO_2$-emission electricity such as derived from renewable or nuclear sources.

SUMMARY OF THE INVENTION

There is an object of the present invention to provide an electrochemical system, apparatus and method to generate metal hydroxide in the presence of metal silicates.

According to one aspect of the invention, there is provide an apparatus for electrochemically generating metal hydroxide, oxygen and hydrogen, the apparatus comprising:
an electrolytic container having an anode, a cathode, a direct current source connected to the anode and the cathode, an electrolytic solution comprising a metal salt, the electrolytic solution disposed in said electrolytic container to undergo electrolysis when a direct current is applied, at least one ion-exchange membrane disposed in said electrolytic container between said anode and said cathode and defining a cathode region and an anode region;
a second container disposed externally to said electrolytic container for holding a quantity of a solid metal silicate material, the second container being in fluid communication with said electrolytic container;
means for supplying acidic solution from the anode region to said second container to effect dissolution of said solid metal silicate material and to generate a metal salt solution, wherein the solid metal silicate material, the acidic solution, and the electrolytic solution have been chosen so that:
(i) the metal in the solid silicate material and the metal in said metal salt are the same; and
(ii) the metal salt solution and the electrolytic solution contain said metal salt;
means for supplying the metal salt solution from said second container to said electrolytic container.

The apparatus further comprises purification means for purifying said metal salt solution, before passing the purified metal salt solution from said second container to said electrolytic container.

In the apparatus described above, the purification unit is configured to remove silica and other compounds from said metal salt solution, the purification unit being disposed between said second container and said electrolytic container.

The apparatus comprises a cation exchange membrane and an anion exchange membrane disposed in said electrolytic container between said anode and said cathode and defining an anode region, a cathode region and a central region therebetween.

The apparatus further comprises means for removing gaseous and liquid products from the electrolytic container.

Also the apparatus further comprises means for removing and storing the metal hydroxide.

In one embodiment of the apparatus described above, the solid metal silicate is magnesium silicate.

The apparatus further comprises means for removing an acid gas from air or a gas volume using said metal hydroxide, for example for removing carbon dioxide.

According to another aspect of the invention, there is provided a method of generating hydrogen, an oxidative gas and a metal hydroxide for sequestering gaseous carbon dioxide or other acid gases, the method comprising:
(a) supplying a direct current from an electrical source at a predetermined voltage to an electrolytic container having an anode, a cathode, an electrolyte solution and comprising a metal salt, an anode region adapted to generate the oxidative gas and an acidic solution, and a cathode region adapted to generate hydrogen gas and a dissolved metal hydroxide solution, the metal in said dissolved metal hydroxide solution being derived from the electrolyte solution;
(b) supplying, from a source disposed externally to the electrolytic container, a metal silicate soluble in the acidic solution;

(c) removing the acidic solution from the anode region to another container outside the electrolytic container, for reacting the removed acidic solution with the metal silicate to generate a metal salt solution, wherein the metal is derived from the metal silicate;

(d) reacting the metal salt solution from the step (c) with the dissolved metal hydroxide solution of the step (a) to produce a reaction solution and generate another metal hydroxide, wherein the metal in said another metal hydroxide is derived from the metal silicate;

(e) separating said another metal hydroxide from the remaining reaction solution in the step (d); and (f) supplying the remaining reaction solution back to the electrolytic container for use as the electrolyte solution.

The method further comprises purifying the metal salt solution after the step (c).

In the method described above:
the step (a) comprises providing the electrolyte solution comprising a soluble monovalent metal salt; and
the step (c) comprises generating the metal salt solution predominantly comprising one or more metals having valency of two or higher.

In the method described above:
the soluble monovalent metal salt contains ions of Na or K; and
the metal derived from the metal silicate is one or more selected from the group consisting of Mg, Ca, Fe, and Cr.

In the method described above, the metal silicate comprises magnesium silicate.

In the method described above, the steps (d) and (e) are conducted in a reactor vessel externally to the electrolytic container.

In the method described above, the metal hydroxide in the step (e) is solid metal hydroxide, for example solid magnesium hydroxide.

The method of claim 10, further comprising using said metal hydroxide for removing an acid gas from air or gas volume.

In one embodiment of the method described above, the acid has is carbon dioxide.

The method further comprises using a cation exchange membrane and an anion exchange membrane, for defining the anode region, the cathode region and a central region of the electrolytic container.

According to yet another aspect of the invention, there is provided an apparatus for electrochemically generating metal hydroxide, oxygen and hydrogen, the apparatus comprising:

an electrolytic container having an anode, a cathode, a direct current source connected to the anode and the cathode, an electrolyte solution disposed in said electrolytic container to undergo electrolysis when the direct current is applied, two ion-exchange membranes disposed in said electrolytic container between said anode and said cathode and defining a cathode region, an anode region and a central region between said anode region and said cathode region;

a second container disposed externally to said electrolytic container for holding a quantity of a solid metal silicate material, the second container being in fluid communication with said electrolytic container;

means for supplying acidic solution from the anode region to said second container to effect dissolution of said solid mineral silicate material and to generate a metal salt solution wherein the metal is derived from said solid metal silicate material;

purification means configured to purify said metal salt solution;

a hydroxide reactor in fluid communication with said electrolytic container, for precipitating low-solubility metal hydroxides whose metal is derived from the dissolution of the solid metal silicate material; and a filtering unit connected to the hydroxide reactor and configured for separating the low-solubility precipitate from a solution removed from the hydroxide reactor.

Thus, an improved electrochemical system, apparatus and method to generate metal hydroxide in the presence of metal silicates have been provided.

BRIEF DESCRIPTION OF THE DRAWINGS

The accompanying drawings, which constitute a part of the specification, illustrate specific embodiments of the invention and, together with the detailed description of the specific embodiments, serve to explain the principles of the invention.

DETAILED DESCRIPTION OF THE EMBODIMENTS

Terminology

For convenience, a list of most frequently used terms in the application are listed below.

10: Electrolytic container, or first container
12: Anode
13: Anode region
14: Cathode
15 Cathode region
16 Source of direct current
17 Central region of the electrolytic container 10 between CEM 18 and AEM 26
18 Cation exchange membrane (CEM)
20 Second container for holding silicate material
22: Conduit for supplying acidic solution from the anode region 13 to the second container 20
24: Conduit for passing aqueous solution from the second container 20 back to the electrolytic container 10
25: Conduit connection to cathode region 15 to remove hydroxides
26: Anion exchange membrane (AEM)
27: Source of metal silicate, also a metal silicate mass in FIG. 7

Figure 7:
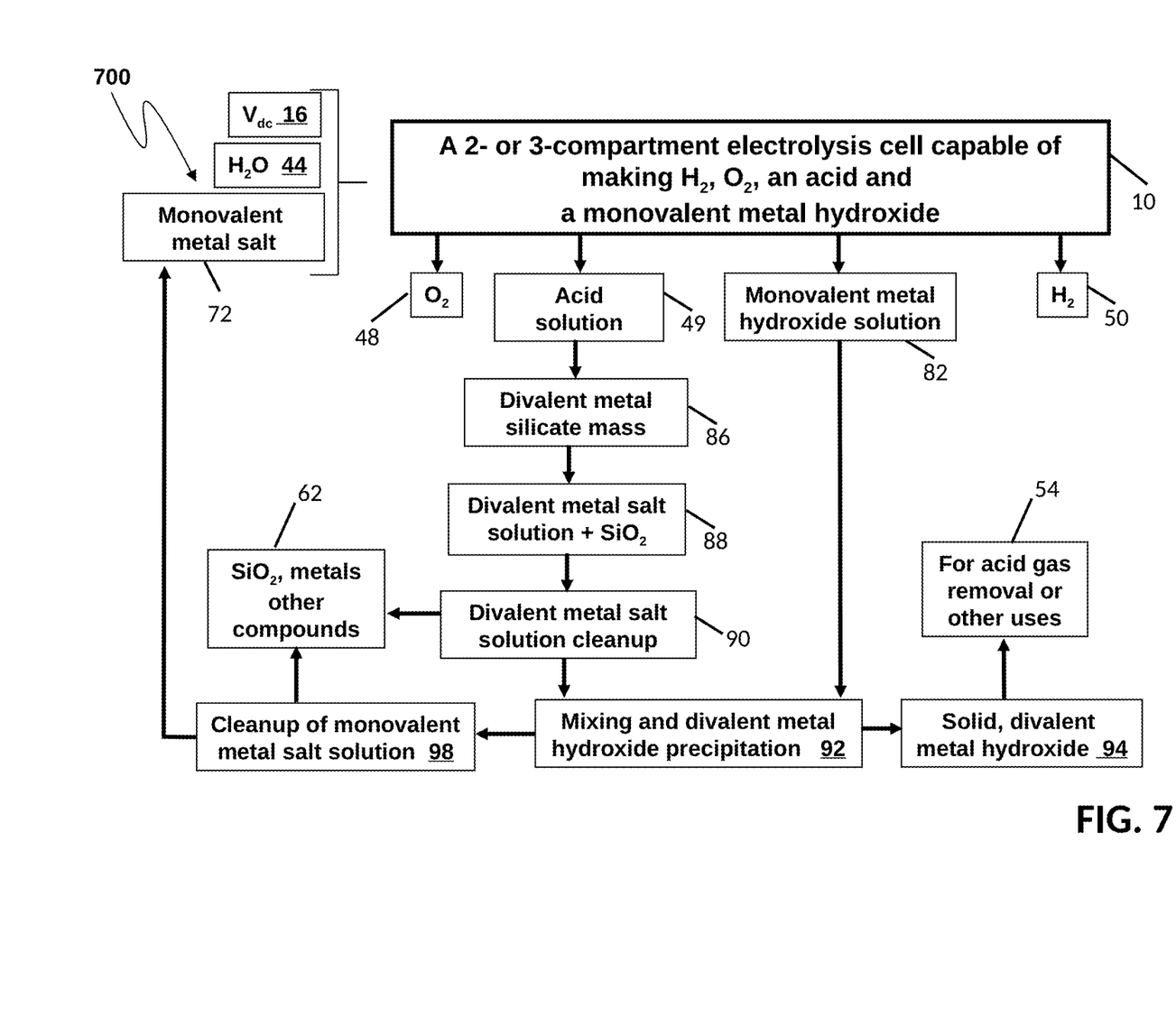
FIG. 7 shows a flow chart diagram illustrating the operation of the apparatus of FIG. 4 and FIG. 5.

29: Purification unit for removing silica from solution exiting the second container 20
31: Unit containing metal hydroxide solution
34 Hydroxide reactor
36 Settling/Filtration unit
38: Electrolyte Cleanup unit for removing solids, mostly magnesium hydroxide, from solution exiting from reactor 34 before return to the electrolyzer
42: Soluble metal salt supply
44: Water supply
48: Oxygen product
49: Acid solution
50: Hydrogen product
52: Metal hydroxide solution
54: Gas/Liquid Contactor for Metal hydroxide use, for example for acid gas removal
56: Metal silicate mass reaction with acid solution
58: Metal salt solution with silica
60: Metal salt solution cleanup
62 Silica and other components removed
64: Clean metal salt solution recycling
72: Monovalent metal salt supply
82: Monovalent metal hydroxide solution
86 Divalent metal silicate mass
88: Divalent metal salt solution and silica
90 Divalent metal salt solution cleanup
92: Metal hydroxide precipitation
94 Solid metal hydroxide
98 Monovalent metal salt solution cleanup In the embodiment 100 illustrated in FIG. 1, an electrolytic container 10, also to be referred to as first container 10, has an anode 12 and a cathode 14, both electrodes connected to a source 16 of direct current. The electrolytic container 10 has a cation exchange membrane (CEM) 18 disposed between the anode 12 and the cathode 14, the CEM membrane 18 dividing the electrolytic container 10 into an anode region 13, and a cathode region 15, also to be referred to as an anode chamber 13 and cathode chamber 15 respectively. The electrolytic container 10 is filled at least partially with a conductive electrolytic solution, or electrolyte solution, containing an electrolyte, for example a metal salt dissolved in a polar solvent such as water, such that when the direct current (DC) is applied to the anode 12 and the cathode 14, oxygen or another oxidative gas is generated at the anode 12, and hydrogen is generated at the cathode 14, both gases being removed from the electrolytic container 10 in a well-known manner.

Figure 1:
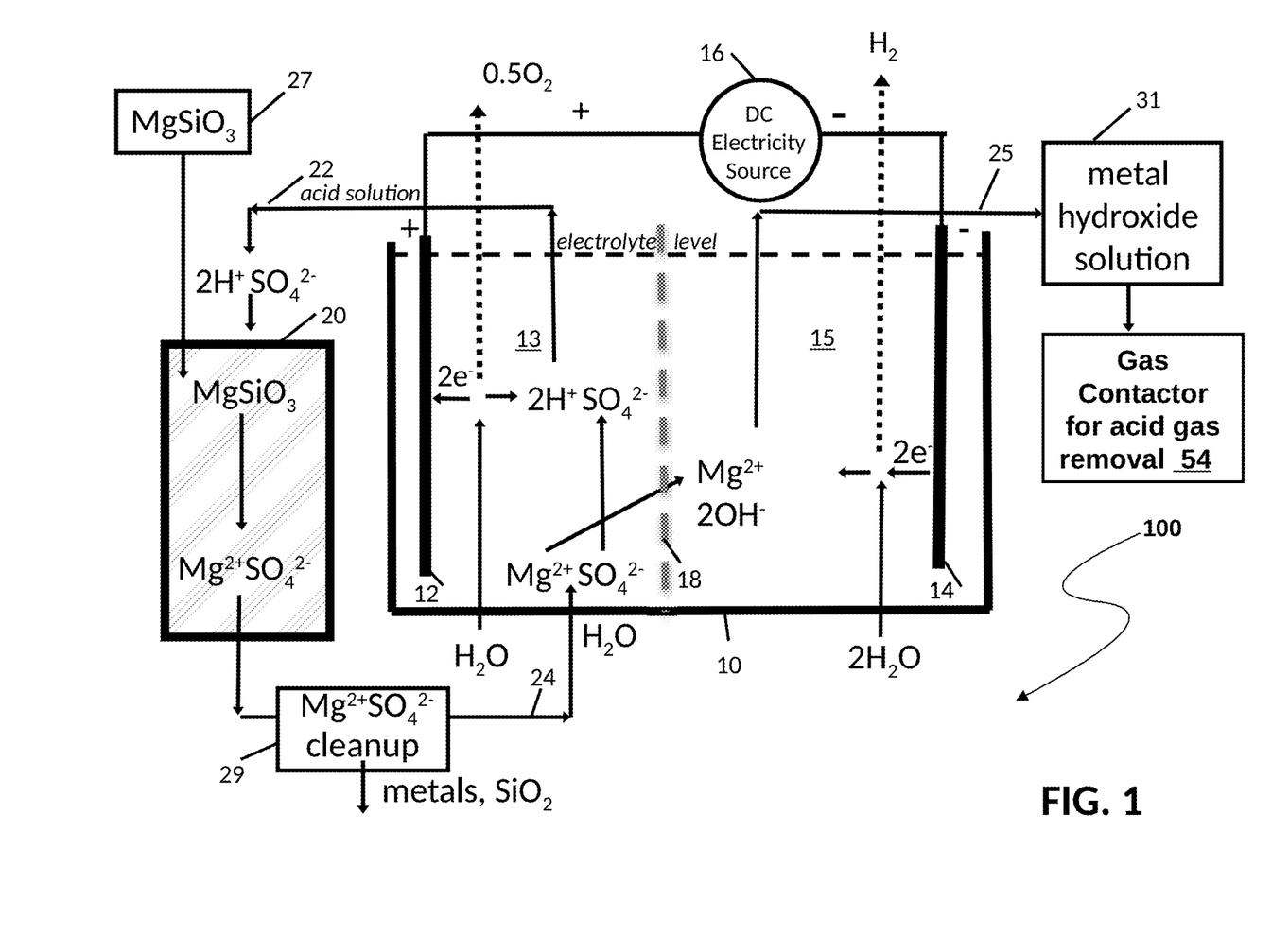
FIG. 1 is a schematic illustration of an embodiment of the apparatus of the present invention with a 2-chambered electrochemical container, or electrolyzer.

A second container 20 for holding a solid metal silicate material, for example magnesium silicate material, is disposed in the proximity of and outside the electrolytic container 10, the second container 20 being in fluid communication with the electrolytic container 10 by way of a conduit 22 for supplying acidic solution from the anode region 13 to the second container 20, to effect a reaction of the acidic solution with the metal silicate material, and a conduit 24 for passing aqueous solution from the second container 20 back to the electrolytic container 10. A conduit 25 is connected to the cathode region 15 to remove metal hydroxide produced during hydrolysis from the electrolytic container 10. A source 27 of solid metal silicate is provided for replenishing the silicate content in the second container 20.

A purification unit 29 is installed on the conduit 24 for removing at least some undesirable impurities, such as silica, and certain metals, from the solution leaving the second container 20 before the purified solution is returned to the electrolytic container 10.

Unit 31 is provided to retain effluent from the cathode region 15, the effluent containing metal hydroxide, in this embodiment magnesium hydroxide, before further processing of the metal hydroxide, for example in a gas contactor 54 for acid gas removal, for example carbon dioxide removal.

Pumps, valves and control equipment are used in a known manner and not illustrated herein.

As shown in FIG. 1, the electrolysis of a metal salt, in this case magnesium sulfate ($MgSO_4$), dissolved in water generates hydrogen gas ($H_2$) and hydroxide ions ($OH^-$) at the cathode 14 and oxygen ($O_2$) gas and hydrogen ions ($H^+$) at the anode 12. The OH ions are then charge-balanced by $Mg^{2+}$ (from the metal salt) forming a metal hydroxide, and the $H^+$ ions are balanced by the $SO_4^{2-}$ ions (from the metal salt) forming an acid, in this case sulfuric acid, $H_2SO_4$. Some of the catholyte solution now containing the metal hydroxide, in this case $Mg(OH)_2$, is withdrawn from the cell 10 into unit 31 for use or further processing.

The acid formed (e.g., $H_2SO_4$) is reacted with a mass of alkaline metal silicate, in this case $MgSiO_3$ mineral as contained in certain rocks. This reaction occurs in a separate vessel 20. Acid solution is withdrawn from the anode chamber 13 of the electrolysis cell 10 and introduced into the vessel 20. The rate and degree of the reaction of the acid and the metal silicate can be desirably increased by using elevated temperature, agitation, mixing, stirring and/or solution recycling within the reactor vessel, treatments that would be difficult or impossible to do if the reaction were performed within the electrolysis cell. Other embodiments may simply use a pile, heap or bed of metal silicate where acid is added to the top of the metal silicate mass and by gravity allowed to travel through and react with the metal silicate mass. If the solution recovered from the reaction vessel or metal silicate mass contains a significant amount of unreacted acid solution, the solution may be returned to the vessel or mass for further contacting and reaction with the metal silicate to increase the amount of metal salts or other products produced.

The reaction between the metal silicate and the acid solution produces water and a metal salt, in the example shown, $MgSO_4$ (FIG. 1). The dissolved portion of the metal salt and the water 24 are then returned to the anolyte (region 13) to resupply electrolyte and water 24. By analogy, metals other than Mg may participate in the preceding metal silicate/acid reaction as dictated by the metal composition of the metal silicate used, the metal's reactivity with the acid and the metal's solubility in water. As well, anions other than $SO_4^{2-}$ may balance the preceding metals forming the metal salt, as dictated by the anions originally introduced as part of the electrolyte in the electrolysis cell. Metal salts originally introduced as electrolyte include but are not limited to sodium ($Na^+$), potassium ($K^+$), magnesium ($Mg^{2+}$) and calcium ($Ca^{2+}$) sulfate ($SO_4^{2-}$), nitrate ($NO_3^-$), phosphate ($PO_4^{3-}$) and chloride ($Cl^-$).

Whatever metal salt electrolyte is initially used, an important feature of this embodiment is that the anion portion of the electrolyte is mostly if not entirely conserved and recycled, while the metal cation portion of the salt electrolyte is renewed from the metal silicate.

Thus, the metal cations initially composing the electrolyte of the electrolytic container 10 are eventually replaced by metal cations derived from the metal silicate, and the metal composition of the electrolyte can therefore change over time if the initial metal cations differ from those derived from the metal silicate.

The purity of the metal salt solution formed from the reaction of the metal silicate with the acid is a concern when the resulting metal salt solution is used as an electrolyte. It is therefore desirable to avoid the presence of ions and compounds that degrade the performance of the electrolytic container 10. It may also be desirable to remove other constituents formed in the mineral/acid reaction that may have commercial value. These constituents can include but are not limited to aluminum, chromium, nickel, cobalt, iron and/or silica.

Figure 2:
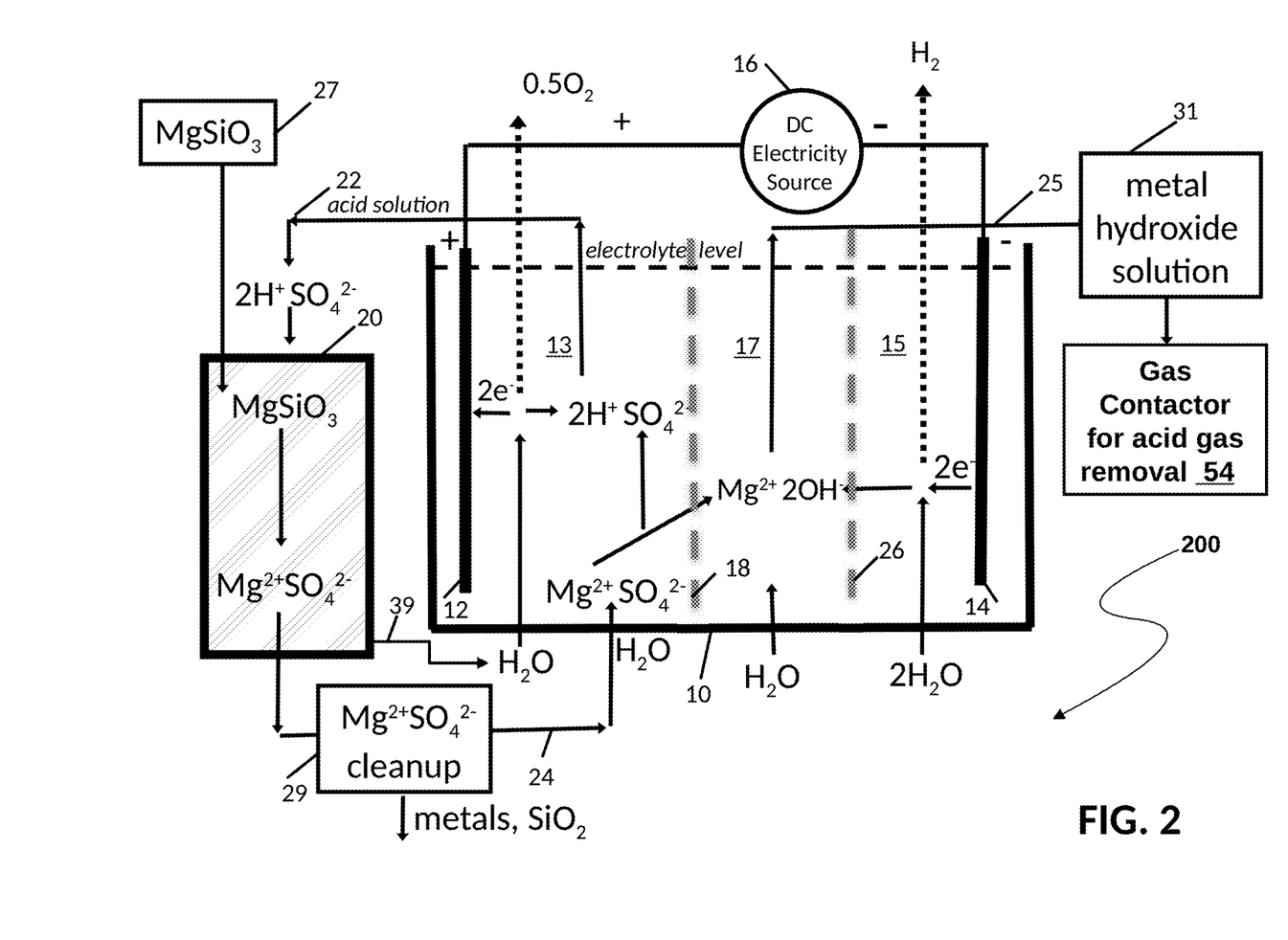
FIG. 2 is a schematic illustration of another embodiment of the apparatus with a 3-chambered electrochemical container.

Various methods can be employed for removing such constituents from the metal salt solution prior to its use as the electrolyte in the electrolytic cell 10 (FIGS. 1 and 2). Such methods include filtration, settling, pH adjustment and precipitation, ion exchange or other purification methods. The removal, also referred to as cleanup procedure, takes place in unit 29. Thus, it is a feature of the invention to provide removal of co-products from the metal salt electrolyte generated in the metal silicate/acid reaction prior to the introduction of the effluent from the second container 20 into the electrolyzer 10.

A cation exchange membrane 18 within the electrolytic container 10 (FIG. 1) is used to help:
i) separate the acid and the base, thus preventing their reaction and neutralization with each other, and
ii) retain the salt anion (in this case $SO_4^{2-}$) in the anolyte and prevent its loss with the removal of the metal hydroxide formed in the cathode region 15.

The balancing metal cations in the metal salt and, hence, the metal hydroxide formed can be at least one of Na, K, Ca, Mg, Al, Fe or other metals, when the metal composing the source metal silicate used: i) contains the corresponding metal, and ii) forms a soluble, dissolved salt during the metal silicate/acid reaction in the second container 20.

It is preferable that the metal silicate be crushed or ground to provide sufficient reactive surface area for contacting and reacting with the acid, and means may be needed to resupply crushed or ground metal silicate that is consumed by the process.

The anions balancing the metal cations in the metal salt can be $SO_4^{2-}$, $PO_4^{3-}$, $NO_3^-$, or other anions:
i) whose pairing with the metal cations forms a metal salt that is soluble in water, and
ii) whose pairing with $H^+$ forms an acid that can react with the metal silicate to form a metal salt and water.

The use of a metal salt solution containing chloride ion, $Cl^-$, can be used as the electrolyte if an acid of sufficient strength to dissolve metal silicate can be generated by the electrolysis of the metal chloride solution.

This can occur via the reaction of the $Cl_2$ (now preferably discharged instead of $O_2$ at the anode) and water to produce a mixture of hypochlorous acid, HOCl, and hydrochloric acid, HCl: $Cl_2 + H_2O \rightarrow HOCl + HCl$.

HCl can also be generated by the reaction with the $H_2$ gas produced at the cathode, and $Cl_2$ gas produced at the anode: $H_2 + Cl_2 \rightarrow 2HCl$.

It is also possible to use certain current densities, for example described in a paper to Bennett, J. E. Electrodes for generation of hydrogen and oxygen from seawater. Int. J. Hydrogen 1980, 5, 401-408., in the electrolytic container 10 or to use anodes 13 of certain composition, for example as describe in the paper to Bennett, 1980 cited above, to selectively discharge of $O_2$ rather than $Cl_2$ at the anode 13, thus allowing the $H^+$ produced at the anode 13 to pair with the $Cl^-$ in the electrolyte to form HCl. Water of sufficient purity, such as de-ionized water, must be replenished in the electrolytic container 10 to make up for the water lost to the production of $H_2$ and $O_2$ and the water lost in the removal of the metal hydroxide solution from the electrolytic container 10.

FIG. 2 illustrates a second embodiment 200 using both a cation exchange membrane 18 and an anion exchange membrane 26 to create a 3-chambered electrolytic container 10, now having an anode region (anolyte chamber) 13, a cathode region 15 and a central region 17. Here the anolyte chamber 13 of the cell is configured and operated as in FIG. 1, but where the metal cations from the metal salt electrolyte and $OH^-$ produced at the cathode 14 combine to form a metal hydroxide in the central region 17. This prevents the formation of metal hydroxide from occurring in close proximity to the cathode 14 where the precipitation of the metal hydroxide may occur and thus degrade the operation of the electrolytic container 10.

Similarly as in FIG. 1, fresh metal salt electrolyte solution 24 derived from the metal silicate/acid reaction in the container 20 is returned to the electrolyzer 10 to compensate for the removal of the acid solution and for the loss of water as $O_2$ and $H^+$ in the anode region 13. Water is also added to the central region 17 and cathode region 15 to make up for metal hydroxide solution removed from the central region 17 and for the consumption of water in the cathodic formation of $H_2$ and $OH^-$.

In the embodiments of FIG. 1 and FIG. 2, the basic chemical reaction sequence is:

$MgSO_4 + 3H_2O + Vdc \rightarrow H_2 + 0.5O_2 + H_2SO_4 + Mg(OH)_2$ (reaction 1)

$H_2SO_4$ + rock/ore (containing $MgSiO_3$ and other metal silicates and oxides) $\rightarrow MgSO_4 + H_2O$ + other metal compounds + $SiO_2$ (reaction 2)

where the $MgSO_4$ and $H_2O$ (24) produced in reaction 2 (container 20) are then used in reaction 1 (electrolytic cell 10). This in effect recycles the $SO_4^{2-}$ and some water portion of the electrolyte (via 22, 24 in FIGS. 1 and 2) while extracting Mg from metal silicates (20, FIGS. 1 and 2) to generate the Mg portion of the electrolyte used in 13 (FIGS. 1 and 2) and the Mg portion of the $Mg(OH)_2$ formed in 15 (FIG. 1) or 17 (FIG. 2).

Figure 3:
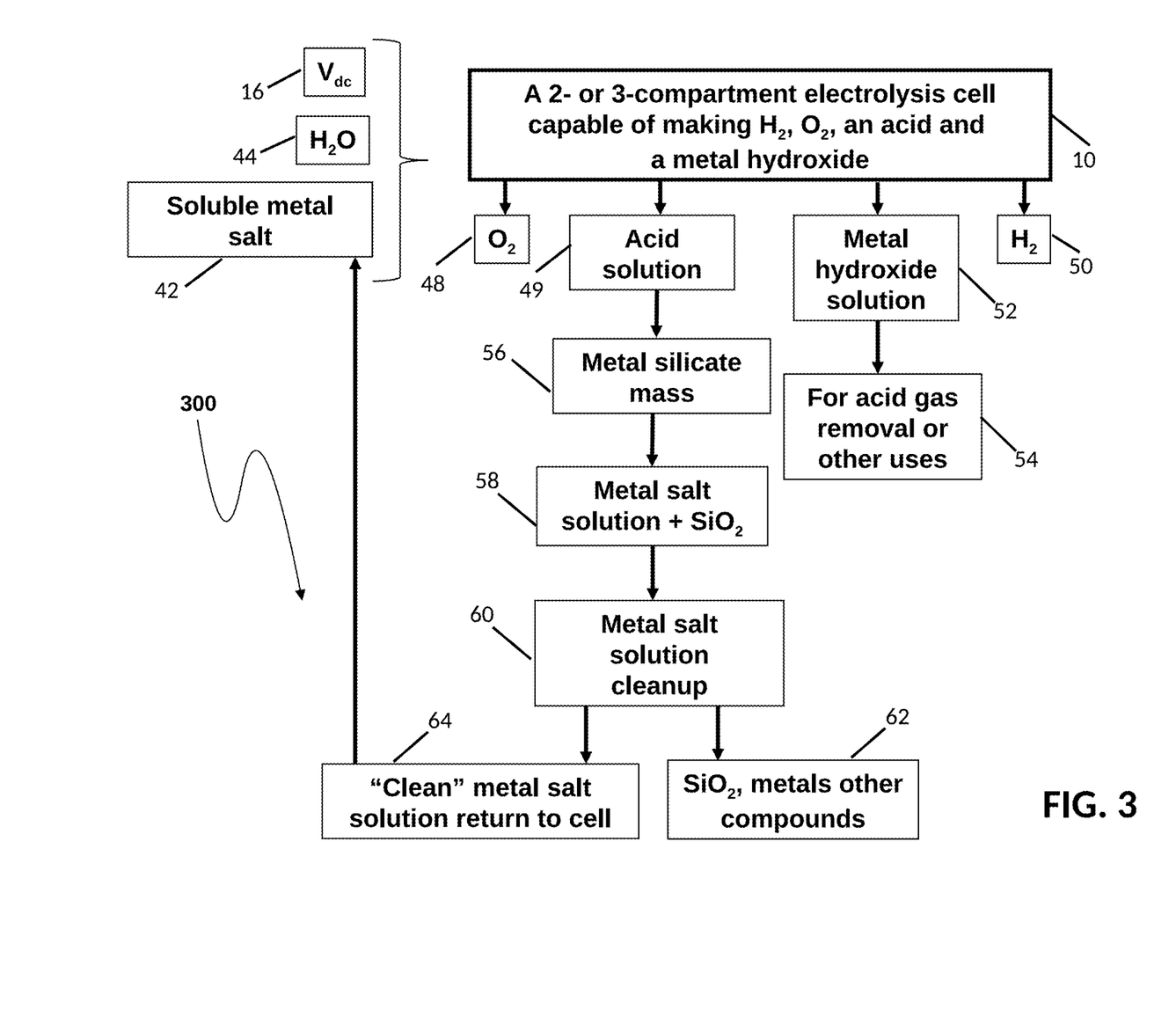
FIG. 3 shows a flow chart diagram illustrating the operation of the apparatus of FIG. 1 and FIG. 2.

A flow chart 300 of the general operation of the preceding embodiments illustrated in FIG. 1 and FIG. 2 is shown in FIG. 3.

The electrolytic container 10 is supplied with a soluble metal salt 42 and water 44. A direct voltage 16 is applied to the electrodes of the electrolytic container 10 resulting in the generation of oxygen 48, hydrogen 50, a metal hydroxide solution 52 and an acid solution 49. Hydrogen and oxygen gases are removed. The metal hydroxide solution 52 is removed to a container 31 (FIG. 1 and FIG. 2) and used for various purposes 54, specifically for capture of acid gases such as carbon dioxide or sulfur dioxide.

The acid solution 49 is transferred by conduit 22 to the second container 20 (FIGS. 1 and 2) where it reacts with a metal silicate mass in step 56 to generate a metal salt solution and silica $SiO_2$ 58, followed by a metal salt cleanup procedure 60 performed in the unit 29 in FIGS. 1 and 2. Silica and optionally other compounds or metals 62 are removed in the unit 29 while the remaining solution 64 is returned to the electrolytic container 10 of FIG. 1 and FIG. 2.

Figure 4:
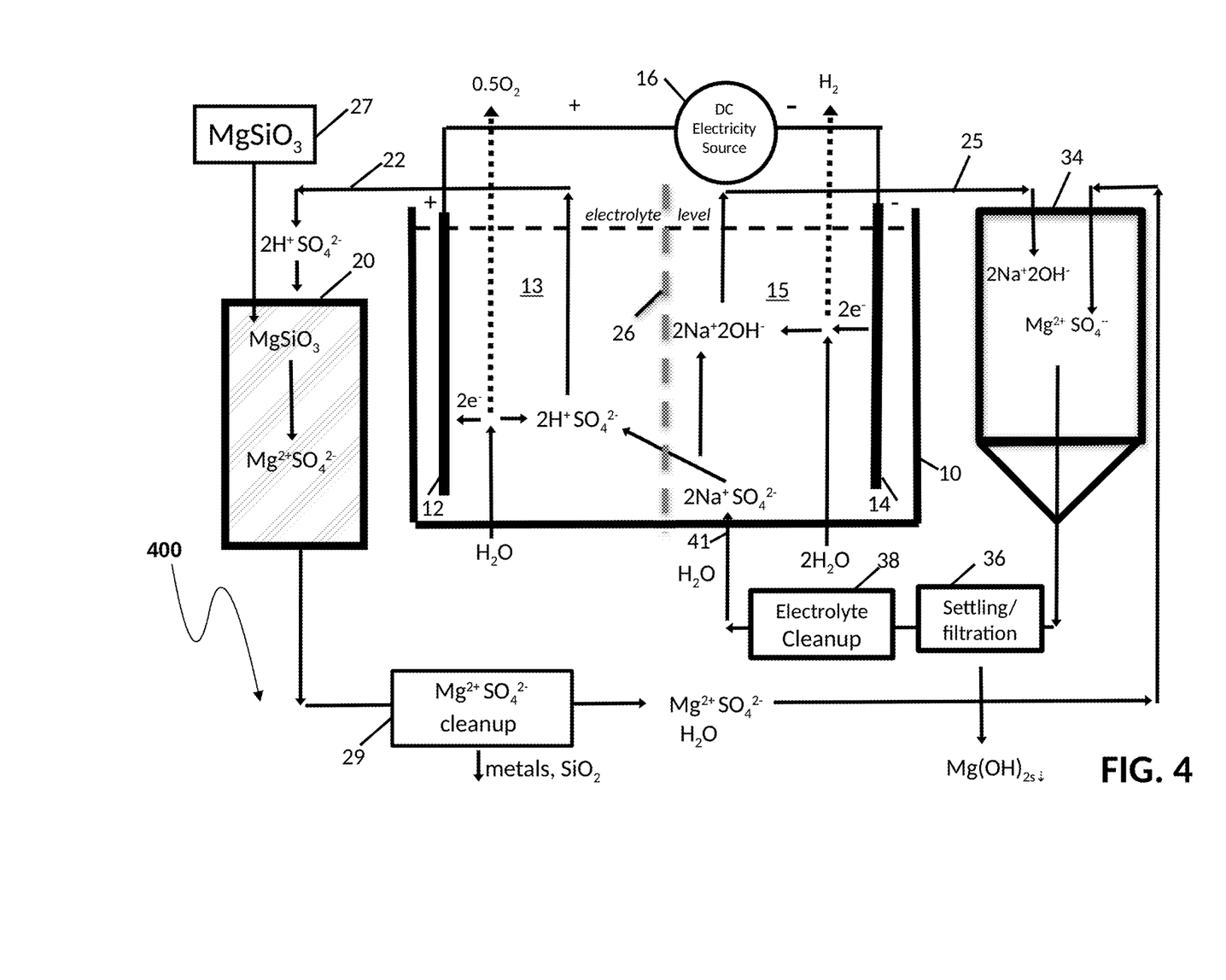
FIG. 4 is a schematic illustration of another embodiment of the apparatus of the present invention with a 2-chambered electrolyzer and a reactor for generating a solid metal hydroxide.

An apparatus 400 of a third embodiment of the invention shown in FIG. 4 uses the anion exchange membrane 26 to separate the anode region 13 and cathode region 15, and thus keeps separate the acid and hydroxide produced in the anode and cathode regions, respectively. Here, the metal used in the electrolyte is preferably a monovalent metal such that the metal hydroxide formed in the cathode region 15 has high solubility, and thus the undesirable fouling of the cell by the precipitation of solid metal hydroxide is reduced or avoided.

In particular, a dissolved metal salt of a monovalent metal ion is used as the electrolyte, for example $Na^+$ or $K^+$ as balanced by anions such as $SO_4^{2-}$, $PO_4^{3-}$, $NO_3^-$ or other anions. In these cases, the metal salt as well as water are split to form $H_2$ and a highly soluble metal hydroxide at the cathode such as NaOH or KOH, while the anion portion of the electrolyte passes through the anion exchange membrane 26 to pair with the $H^+$ formed at the anode 12 to produce an acid, where $O_2$ (or $Cl_2$) is also discharged. In the example shown in FIG. 4, $Na_2SO_4$ is used as an electrolyte.

The acid solution formed in the anode region 13 is withdrawn and reacted with a metal silicate mass 27 in the second container 20 to produce a metal salt solution as previously described. Here, due to their abundance in metal silicates, divalent and higher valency metal ions, such as $Mg^{2+}$, $Ca^{2+}$ and $Fe^{2+}$, are likely to be present in the metal salt produced in the second container 20, for example $Mg^{2+}$ as shown in FIGS. 1-4.

Figure 5:
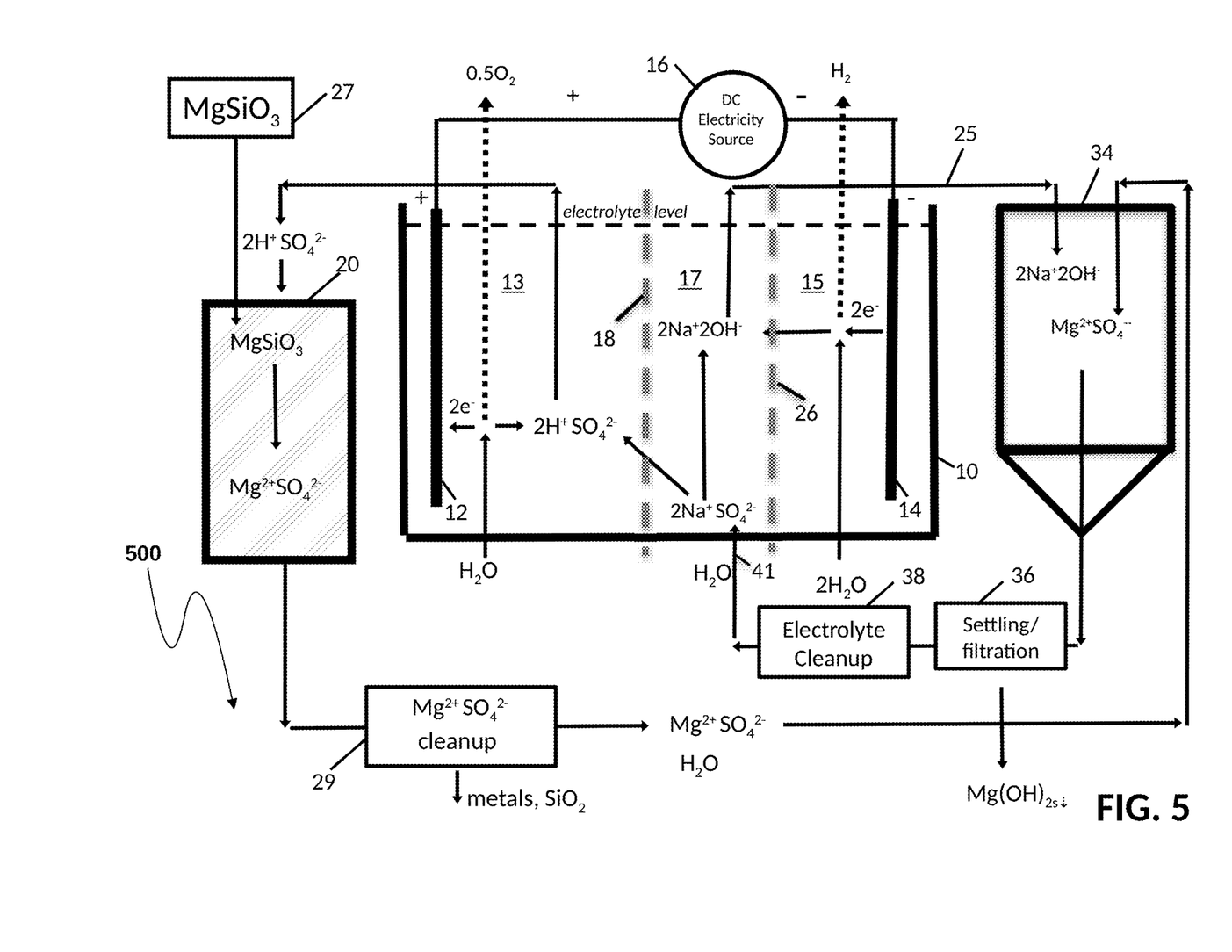
FIG. 5 is a schematic illustration of yet another embodiment with a 3-chambered electrolyzer and a reactor for generating a solid metal hydroxide.

Unlike embodiments 100 and 200 (FIGS. 1 and 2), the metal salt solution produced in the second container 20 (FIG. 4) is not returned to the electrolyzer 10 directly following the silica removal in unit 29, and is instead transferred to a reactor 34 (FIG. 4) to which is also added the metal hydroxide solution produced in the cathode region 15 of container 10 (FIG. 4 and FIG. 5). In the reactor 34, due to the differences in solubility between the monovalent metal ions provided by the metal hydroxide and the divalent or higher valency metal ions provided by the metal salt, divalent of higher valency metal hydroxide precipitates from the solution, thus leaving the reformed monovalent metal salt dissolved in solution.

The precipitate, solid metal hydroxide formed in the reactor 34 can be further separated from the dissolved metal salt solution via flocculation followed by settling-thickening filtration, centrifugation or other solid/liquid separation methods which take place in units 36 (Settling/Filtration) and 38 (Electrolyte Cleanup) as shown in FIG. 4 and FIG. 5.

The monovalent metal salt solution, effluent from units 36 and 38, e.g., $Na_2SO_4$ solution, is then returned 41 to the cathode region 15 of the electrolytic container 10 to provide fresh electrolyte.

A further embodiment 500 is illustrated in FIG. 5 wherein both a cation exchange membrane 18 and an anion exchange membrane 26 are used to form a 3-compartment electrolytic container 10. Here, a metal salt electrolyte solution, e.g., $Na_2SO_{4aq}$, fills the central region 17, and water fills the anode region 13 and the cathode region 15. With sufficient $V_{dc}$ applied on the anode 12 and cathode 14, a metal hydroxide solution (e.g., NaOH) is now formed in the central region 17, acid (e.g., $H_2SO_{4aq}$) and $O_2$ are formed in the anode region 13, and $H_2$ and $OH^-$ are formed in the cathode region 15. The respective solutions in each region 13, 15 and 17 are replenished to compensate for loss of water and electrolyte 41 in water electrolysis, and in metal hydroxide formation and removal. Other aspects of this embodiment have been described above with regard to FIG. 4.

Thus, due to the provision of the reactor 34, the embodiments of FIG. 4 and FIG. 5 avoid the undesirable formation of easily-precipitated metal hydroxides from forming within the electrolytic container 10 while also largely regenerating and conserving electrolyte and water. This is achieved by the intentional formation and removal of solid metal hydroxide in the reactor 34, externally to the electrolytic container 10, and recycling the solution from reactor 34 to the electrolytic container 10, as illustrated in FIGS. 4 and 5.

In the embodiments of FIG. 4 and FIG. 5, the basic chemical reaction sequence is:

$$Na_2SO_{4aq} + 3H_2O + V_{dc} \rightarrow H_2 + \tfrac{1}{2}O_2 + H_2SO_{4aq} + 2NaOH_{aq} \quad \text{(reaction 3)}$$

$$H_2SO_{4aq} + \text{rock (containing } MgSiO_3 \text{ and other metal silicates and oxides)} \rightarrow MgSO_4 + H_2O + \text{other metal compounds} + SiO_2 \quad \text{(reaction 4)}$$

$$MgSO_{4aq} + 2NaOH_{aq} \rightarrow Na_2SO_{4aq} + Mg(OH)_{2s} \quad \text{(reaction 5)}$$

where $Na_2SO_{4aq}$ produced in reaction 5 (ion exchange reactor 34) and the $H_2O$ (39) produced in reaction 4 (container 20) are returned to reaction 3 (electrolytic container 10), and $Mg(OH)_2$ is removed from solution as a solid. This in effect allows recycling of the $Na_2SO_{4aq}$ and some water portion of the electrolyte (41), while forming and removing $Mg(OH)_2$ as a solid, as well as generating $H_2$, $O_2$, other metal compounds and silica.

In all of the preceding embodiments of FIG. 1-5, the metal hydroxide produced can be contacted with air, waste gas stream or other gas volume to remove some or all of any acid gas originally contained in the gas volume. Such removal occurs when the gas volume containing $CO_2$ and/or any other acid gas is contacted by the above-mentioned metal hydroxide solution, then forming a metal salt of the acid gas.

For example:

$$Mg^{2+} + 2OH^- + 2CO_{2g} \rightarrow Mg^{2+} + 2HCO_3^- \quad \text{(reaction 6)}$$

where $Mg^{2+} + 2OH^-$ represents $Mg(OH)_2$ dissolved in water, i.e., $Mg(OH)_{2aq}$. $Mg^{2+} + CO_3^{2-}$ ($MgCO_{3aq}$) may also form via equilibrium reactions. Furthermore, $MgCO_{3s}$ may be formed as a solid, and may precipitate from solution. The formation of $Mg(HCO_3)_{2aq}$, $MgCO_{3aq}$ and/or $MgCO_{3s}$ causes the original acid gas, in this case $CO_2$, to be sequestered from the gas volume, thus desirably reducing its acid gas burden. By analogy, other metal hydroxides can be produced by the embodiments of the present invention such as $Ca(OH)_2$ and $Fe(OH)_2$, and may be used in the preceding reactions to reduce the acid gas burden in a gas volume.

When the metal hydroxide is in dissolved form, the contacting of the metal hydroxide solution and the gas volume may occur in a conventional gas/liquid contactor 54 known in the art, thus producing a metal salt of the acid gas, e.g., $Mg(HCO_3)_{2aq}$, $MgCO_{3aq}$ and/or $MgCO_{3s}$ via reaction 6.

Similarly, when the metal hydroxide is in solid form, e.g., a $Mg(OH)_{2s}$, an engineered gas/solids contactor can be employed if sufficient water is supplied to dissolve some of the metal hydroxide to facilitate the formation of dissolved or solid metal salt of the acid gas, e.g., $Mg(HCO_3)_{2aq}$, $MgCO_{3aq}$ and/or $MgCO_{3s}$ via reaction 6. To facilitate transportation and use, the mass of solid, wet, metal hydroxide particles may also be dewatered by pressure filtration, centrifuging, squeezing, heating, evaporation vacuum or other dewatering method to form a dry, metal hydroxide mass.

Figure 6:
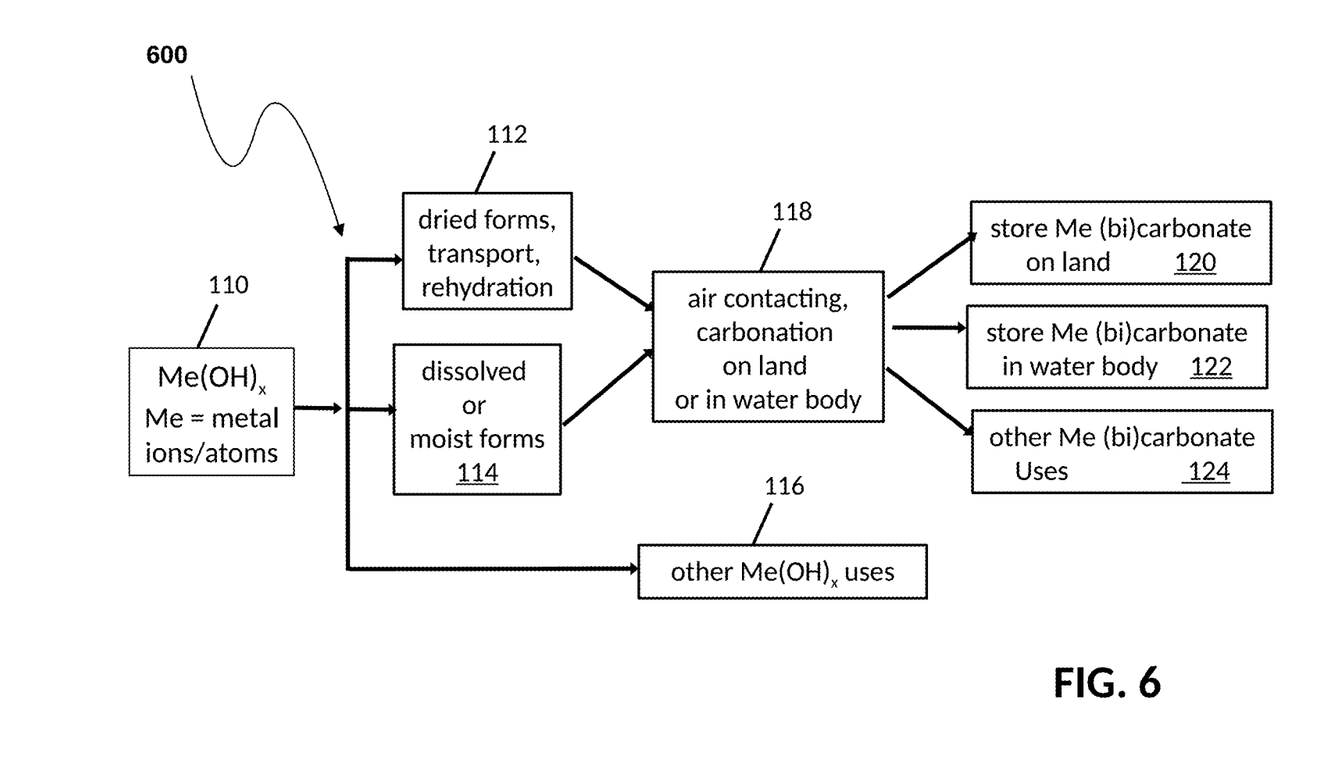
FIG. 6 is an illustration of the exemplary use of the metal hydroxide produced in accordance with embodiments of the present invention.

A flow chart 600 illustrating the possible use of metal hydroxides and (bi) carbonate in performing $CO_2$ removal from air is shown in FIG. 6. Metal hydroxides 110 generated by the method and apparatus of the invention can be produced in dry forms 112 for easier transport and further rehydration; or in dissolved or moist forms 114. The hydroxides may also have other uses 116 unrelated to sequestering of acid gases. The hydroxides, either in dried form 112 or moist/dissolved form 114 can be contacted 118 with contaminants in air, distributed on land or in water bodies. Subsequently, in the case of carbon dioxide capture, metal carbonates or bicarbonates can be stored on land 120, in a water body 122 or used for other purposes 124.

When acid gas removal from air is desired, the metal hydroxide/acid gas contacting can also occur at the interface between a natural or artificial waterbody and the overlying air, wherein the produced metal hydroxide (solid or dissolved) is added to the surface waters of the waterbody, thus chemically increasing the acid gas uptake and retention by the surface waters, and drawing in and sequestering some or all of the acid gas from the overlying atmosphere, e.g., via reaction 6.

Such water bodies include but are not limited to natural ponds, lakes, rivers and oceans as well as artificial reservoirs or wastewater streams. It is desirable to keep the concentration of the added, dissolved metal hydroxide in the water body below that which causes biological or environmental harm, typically a concentration that effects a water body pH of <9, and preferably pH<8.5. Keeping chemical and biological impacts within acceptable/beneficial limits can be facilitated by dilution of the metal hydroxide(s) prior to release into a water body and/or packaging and releasing the metal hydroxide(s) in a way that limits the rate at which dissolve metal hydroxide(s) is/are added to the water body.

A further feature of the invention is that the addition of the metal hydroxide and/or metal (bi)carbonate produced therefrom may be used to beneficially elevate the pH of natural or artificial water bodies whose pH is otherwise below that deemed environmentally optimal.

For example, the metal hydroxide and/or the metal (bi)carbonate produced from it can be added to a wastewater stream whose low pH would otherwise impact the biology and chemistry of the water body receiving the wastewater stream. The produced metal hydroxide and/or produced metal salt can be added to the ocean or other natural water body for the purpose of beneficially raising the pH of the water body. The metal hydroxide and/or the metal (bi)carbonate produced from it may also be added to aquacultural systems to help control pH and to supply beneficial nutrients and elements.

The metal bicarbonate and/or carbonate or other metal salts formed via the metal hydroxide/acid gas reaction may have uses other than for sequestering acid gas or modifying water body pH, and, further, that the metal hydroxide may have uses other than for acid gas removal. These uses include but are not limited to chemical, industrial, environmental, aquacultural and agricultural uses.

The $H_2$ and $O_2$ produced during the electrolysis can be harvested, processed, pressurized, stored and/or used by employing methods known in the art. Alternatively, the $H_2$ and $O_2$ can be reacted internally within the electrochemical cell via the use of a gas diffusion electrode. This reduces the energy cost of the metal hydroxide production, but precludes $H_2$ and $O_2$ as marketable co-products of the system.

Thus, by combining reactions 3-6, the net electrogeochemical reaction in the preceding example is:

(reaction 7)

or if dissolved or solid $MgCO_3$ is formed:

(reaction 8)

Metal hydroxides other than or in addition to $Mg(OH)_2$ may form due to the use of rock/ore containing metals other than or in addition to Mg and therefore that metal bicarbonates and or carbonates other than $Mg(HCO_3)_2$ and $MgCO_3$ may form upon metal hydroxide carbonation. Also, acid gases other than $CO_2$ may participate in these reactions thus forming metal salts other than metal bicarbonate and carbonate.

A flow-chart 700 of the operation of the apparatus of FIG. 4 and FIG. 5 with 2- and 3-compartment electrolytic container 10 respectively for purposes of generating a solid metal hydroxide from a metal silicate is shown in FIG. 7.

In FIG. 7, the electrolytic container 10 corresponds to the electrolytic container 10 in FIGS. 4 and 5. It is supplied with a monovalent metal salt 72 and water 44. A direct voltage 16 is applied to the electrodes of the electrolytic container 10 resulting in the generation of oxygen 48, hydrogen 50, a monovalent metal hydroxide solution 82 and an acid solution 49. Hydrogen and oxygen gases 48, 50 are removed. The metal hydroxide solution 82 is conveyed to a mixing and divalent metal hydroxide precipitation step 92 performed in the hydroxide reactor 34 of FIG. 4 and FIG. 5.

The acid solution 49 is transferred to the second container 20 (FIGS. 4 and 5) where it reacts with a divalent metal silicate mass 86 to generate a divalent metal salt solution and silica $SiO_2$ mixture 88, followed by a metal salt cleanup procedure 90 performed in the unit 29 in FIGS. 4 and 5. Silica and optionally other compounds or metals 62 are removed in the unit 29 while the remaining solution 64 is transferred to the step 92.

In the step 92, a precipitation of solid divalent metal hydroxide 94 from a monovalent metal salt solution takes place. The precipitated hydroxide is removed at step 54 performed in the unit 36 of FIGS. 4 and 5 for acid gas sequestering or other uses. The remaining monovalent salt solution from the step 92 is processed in the step 98 (cleanup of monovalent metal salt solution), performed in the unit 38 and conveyed to the step 72, thus closing a loop.

Example 1

A two-compartment electrolysis cell 10 is assembled such that an anion exchange membrane 26 divides the cathode region 13 and the anode region 15. A platinized titanium or a nickel cathode 14 is inserted into the cathode region 15, and an iridium oxide coated anode 12 is inserted into the anode region 13. The anode region 13 and the cathode region 15 have inlet and outlet ports to facilitate the addition of water and electrolyte solution, and the removal of electrolysis products and any unreacted electrolyte solution.

The cathode region 15 is plumbed to a reservoir containing a 15-25% solution of $Na_2SO_4$ in de-ionized water, and the anode region 13 is plumbed to a source of de-ionized water.

The anode region 13 and the cathode region 15 are filled with the respective solutions, and a direct current electrical potential of 4-6 $V_{dc}$ is applied that allows for the splitting of the salt and water into hydrogen gas ($H_2$), oxygen gas ($O_2$), sulfuric acid ($H_2SO_4$) and sodium hydroxide (NaOH). The $O_2$— and $H_2SO_4$— containing solution is removed from the anode region 13, and dissolved $O_2$ is allowed to further degas from the solution and is either vented to the atmosphere or further processed for use.

De-ionized water is added to the anode region 13 to compensate for the loss of water in the formation of $O_2$ and the removal of the $H_2SO_4$ solution. The rate of the removal of the $O_2+H_2SO_4$ solution from the anode region 13 and the corresponding rate of de-ionized water addition determines the concentration of the $H_2SO_4$ solution formed, with the desired $H_2SO_4$ concentration being >7 wt. % or having a solution pH of <3.

The $H_2SO_4$ solution is pumped to the top of the second container 20 containing a mass (heap, pile or bed) of crushed rock fragments containing metal silicate minerals of the following approximate composition as an example: 38% MgO, 38% $SiO_2$, 18% Fe, 1% CaO, 1% $Al_3O_3$, 0.2% Ni, 0.01% Cr and other constituents.

The $H_2SO_4$ solution applied to the top of the crushed rock mass flows down by gravity through and reacts with the crushed rock mass, producing sulfate salts of the metals contained in the rock mass. Those metal salts that are soluble and still contained in the solution at the bottom of the rock mass are collected at the bottom of the second container 20. The collected solution will primarily contain $MgSO_{4aq}$ as well as smaller quantities of other metal sulfates, any unreacted $H_2SO_4$, dissolved silica, and possibly suspended particles. The acid leaching of the crushed rock mass is allowed to progress until the rate of metal ion concentration increase levels off.

In this example, the most efficient deployment of the embodiments of the invention limits the actual extraction efficiency within a range from about 25% to 80%, preferably from 30 to 60%. This is achieved by setting the mass ratio of the $H_2SO_4$ solution and rock mass within a range from 2:1 to 6:1 preferably from 3:1 to 5:1. The molar ratio of $H_2SO_4$ supplied versus the $MgSO_4$ formed ranges from 0.35 to 0.95, and preferably from 0.45 to 0.65. The irrigation rate of the acid solution should range from 0.08 to 0.4 liters per minute per square meter of rock mass footprint, and preferably from 0.12 to 0.28 liters/(min.×meter$^2$).

The solution collected from the bottom of the rock mass will primarily contain $MgSO_{4aq}$ as well as smaller quantities of other metal sulfates, any unreacted $H_2SO_4$, dissolved silica, and possibly suspended particles.

The solution pH may then be lowered via adding additional $H_2SO_4$ solution to facilitate precipitation of solid or colloidal silica and/or other silicone-containing compounds. These compounds are filtered from the solution or removed by other means and discarded or further processed into marketable products such as silica. The remaining solution, predominantly containing $MgSO_4$aq and smaller quantities of other dissolved metal sulfates, and possibly other compounds, is then pumped into the vessel (reactor) 34 holding a $MgSO_4$ solution.

Meanwhile, a portion of the solution containing $H_2$ and NaOH formed in the cathode region 15 and any unreacted $Na_2SO_4$ solution is removed from the cathode region 15. The removal rate of this solution is such that a 10 wt % or higher wt. % NaOH solution (pH>12) is formed and removed. The $H_2$ gas is separated from the solution and the $H_2$ gas is vented or further processed and stored for eventual use or sale.

The remaining solution, predominantly an NaOH solution is then added to a vessel 34, a reaction reservoir into which the dissolved metal sulfate solution produced in the container 20 is also added. Due to significant differences in solubility of metal ions in the presence of hydroxide ions, the less soluble divalent and higher valency metal hydroxides precipitate from solution. In this case the dominant hydroxide precipitated is $Mg(OH)_{2s}$, followed by lesser quantities of $Fe(OH)_{2s}$, $Ca(OH)_{2s}$, $Ni(OH)_2$ and $Cr(OH)_{3s}$, etc.

The threshold solution pH at which these metal hydroxides precipitate differs among the metal ion species and it is therefore possible to selectively precipitate specific metal hydroxides by sequentially increasing pH. The precipitation sequence as pH rises is: $Cr(OH)_3$, $Ni(OH)_2$, $Fe(OH)_2$ $Mg(OH)_2$, and $Ca(OH)_2$. In any case, the solid metal hydroxides either separately or in bulk are then harvested from solution by filtration or other methods of liquid/solid separation. This can be preceded by adding a flocculant/coagulant such as $Ca(OH)_2$ that speeds the settling of suspended metal hydroxide particles.

The remaining solution in the vessel 34, now predominantly $Na_2SO_{4aq}$, is further processed before being returned to the electrolytic container 10 to function as the electrolyte (e.g., FIGS. 4 and 5). The $Na_2SO_4$ solution processing is to remove any remaining impurities that would interfere with functioning of the electrolytic container 10, in particular the removal of any remaining divalent metal ions and silica. Such processing can include but is not limited to nanofiltration and ion exchange. Any required addition of de-ionized water to make up for $H_2$ and $O_2$ production and other losses is added to the cathode region 15 and the anode region 13 as needed.

The moist, solid metal hydroxides, either the $Mg(OH)_{2s}$ alone or together with the other metal hydroxides harvested as previously described, are spread on the ground (e.g., on top of the mine tailings of the mine from which the metal silicates were mined) so as to facilitate air contacting and the removal and sequestration of $CO_2$ from the air (e.g., via reaction 6 above).

The moist, metal hydroxides may also be added to an artificial pond to elevate OH in the pond and hence facilitate $CO_2$ removal and sequestration from air. Likewise, the metal hydroxides may also be added to surface waters of natural water bodies like the ocean provided that the resulting chemical and biological impacts are acceptable/beneficial, in particular that pH and dissolved metal and Si concentrations do not exceed safe limits.

Keeping chemical and biological impacts within acceptable/beneficial limits can be facilitated by dilution of the metal hydroxide(s) prior to release into a water body and/or packaging the metal hydroxide(s) in a way that limits the rate at which dissolve metal hydroxide(s) is/are added to the water body.

The transport of the metal hydroxides can be facilitated by dewatering the moist, metal hydroxide solids via pressure filtration, centrifuging, heat drying or other methods. Those metal hydroxides not used to facilitate $CO_2$ removal and sequestration can be used for other purposes including refinement to reduced metals such as Fe, Ni and Cr.

Example 2

The above-described electrolysis, hydroxide production and electrolyte recycling (Example 1) can also be performed in a three-compartment cell as illustrated in FIG. 5, wherein the metal salt electrolyte, e.g. $Na_2SO_{4aq}$, is introduced into the central region 17 rather than the anode region 13, and deionized water is introduced into the anode region 13 and the cathode region 15. Here a voltage greater than that applied in the Example 1 (e.g. >6V) is required to overcome the added resistance caused by the use of two membranes in the Example 2 rather than the use of one membrane in the Example 1. Otherwise the features, operation and products of the Example 2 are similar to that of the Example 1.

It is understood that any metalliferous compound may be used in place of the above-mentioned metal silicate if that metalliferous compound reacts with the above-mentioned acid solution to form a metal salt in solution and that metal salt solution can act as an electrolyte and/or as the source of metal hydroxide as described in the preceding embodiments. Such metalliferous compounds include but are not limited to metal carbonates and bicarbonates.

The foregoing has constituted a description of specific embodiments showing how the invention may be applied and put into use. These embodiments are only exemplary. The invention in its broadest, and more specific aspects, is further described and defined in the claims which now follow.

What is claimed is:

1. A method of generating magnesium hydroxide, the method comprising:
 (a) in an electrolytic container having an anode, a cathode, an electrolyte solution containing a monovalent metal salt dissolved in water, generating an acidic solution at the anode, and a metal hydroxide solution at the cathode, a metal in said metal hydroxide solution containing monovalent metal ions derived from the monovalent metal salt;
 (b) in another container:
  (b1) supplying the acidic solution removed at the anode;
  (b2) supplying a metal silicate mass comprising 38% of magnesium oxide;
  (b3) setting a mass ratio of the removed acidic solution and the metal silicate mass within a range from 2:1 to 6:1;
  (b4) irrigating said metal silicate mass with the removed acidic solution at an irrigation rate from 0.08 to 0.4 liters per minute per square meter of the metal silicate mass to generate water and a metal salt solution comprising magnesium salt;
 (c) in yet another container:
  (c1) supplying the metal salt solution containing the magnesium salt of the step (b4);
  (c2) supplying the metal hydroxide solution of the step (a) containing monovalent metal ions; and
  (c3) reacting the metal salt solution with the metal hydroxide solution to produce a reaction mixture containing the electrolyte solution and the magnesium hydroxide; and
 (d) separating the magnesium hydroxide from the electrolyte solution of the step (c3).

2. The method of claim 1, further comprising purifying the metal salt solution after the step (b4).

3. The method of claim 1, wherein the magnesium hydroxide in the step (d) is a solid magnesium hydroxide.

4. The method of claim 1, further comprising using the magnesium hydroxide for removing an acid gas from air or a gas volume.

5. The method of claim 4, wherein the acid gas is carbon dioxide.

6. The method of claim 1, further comprising purifying the electrolyte solution of the step (d).

7. The method of claim 1, wherein said metal is Na.

8. The method of claim 1, wherein, said metal is K.

9. The method of claim 1, further comprising supplying said water generated in the step (c3) back to the electrolytic container, thereby regenerating water in the electrolyte solution of the electrolytic container.

10. The method of claim 1, further comprising supplying the electrolyte solution of the step (d) back to the electrolytic container, thereby regenerating the electrolyte solution.

11. The method of claim 1, wherein the step (a) further comprises removing the acidic solution at the anode and adding de-ionized water at the anode at such rate that a concentration of the removed acidic solution is >7 wt %, corresponding to pH<3.

12. The method of claim 1, wherein the step (a) further comprises removing a portion of the metal hydroxide solution at the cathode, wherein a removal rate is such that at least 10 wt %, corresponding to pH>12, of the metal hydroxide solution is removed.

13. The method of claim 1, wherein the step (b3) comprises setting a mass ratio of the removed acidic solution and the metal silicate mass within a range from 3:1 to 5:1.

14. The method of claim 1, wherein the step (b4) comprises irrigating at the irrigation rate from 0.12 to 0.28 liters per minute per square meter of the metal silicate mass.

15. The method of claim 1, wherein the acidic solution is sulfuric acid solution, and the magnesium salt is magnesium sulfate.

16. The method of claim 13, wherein a molar ratio of the sulfuric acid supplied in the step (b1) versus the magnesium sulfate formed in the step (b4) ranges from 0.35 to 0.95, and preferably from 0.45 to 0.65.

17. The method of claim 1, further comprising dissolving the magnesium hydroxide and adding the dissolved magnesium hydroxide to a water body in a concentration that effects a water body pH of <9.

18. A method of generating magnesium hydroxide, comprising:
 (a) in an electrolytic container having an anode, a cathode, an electrolyte solution containing magnesium salt solution, generating an acidic solution at the anode, and magnesium hydroxide solution at the cathode;
 (b) in another container:
  (b1) supplying the acidic solution removed at the anode;
  (b2) supplying a metal silicate mass comprising 38% of magnesium oxide;
  (b3) setting a mass ratio of the removed acidic solution and the metal silicate mass within a range from 2:1 to 6:1;
  (b4) irrigating said metal silicate mass with the acidic solution removed at the anode at an irrigation rate from 0.08 to 0.4 liters per minute per square meter of the metal silicate mass, and from 0.12 to 0.28 liters per minute per square meter of the metal silicate mass, to generate water and magnesium salt solution; and
 (c) supplying the magnesium salt solution to the electrolytic container as the electrolyte.

19. The method of claim 18, wherein the acidic solution is sulfuric acid solution of concentration >7 wt %, corresponding to pH<3, and the magnesium salt is magnesium sulfate.

20. The method of claim 19, wherein the step (a) further comprises removing a portion of the metal hydroxide solution at the cathode, wherein a removal rate is such that at least 10 wt %, corresponding to pH>12, of the metal hydroxide solution is removed.

* * * * *